(12) United States Patent
Doddaiah et al.

(10) Patent No.: US 12,380,065 B1
(45) Date of Patent: Aug. 5, 2025

(54) TIME SERIES FORECASTING FOR PRE-DEDUPLICATION OF SNAPSHOTS

(71) Applicant: Dell Products, L.P., Hopkinton, MA (US)

(72) Inventors: Ramesh Doddaiah, Westborough, MA (US); Sandeep Chandrashekhara, Shrewsbury, MA (US); Mohammed Asher, Bangalore (IN)

(73) Assignee: Dell Products, L.P., Hopkinton, MA (US)

(*) Notice: Subject to any disclaimer, the term of this patent is extended or adjusted under 35 U.S.C. 154(b) by 0 days.

(21) Appl. No.: 18/731,294

(22) Filed: Jun. 2, 2024

(51) Int. Cl.
| | |
|---|---|
| *G06F 16/11* | (2019.01) |
| *G06F 11/34* | (2006.01) |
| *G06F 16/17* | (2019.01) |
| *G06F 16/174* | (2019.01) |

(52) U.S. Cl.
CPC ........ *G06F 16/128* (2019.01); *G06F 11/3409* (2013.01); *G06F 16/1727* (2019.01); *G06F 16/1748* (2019.01)

(58) Field of Classification Search
CPC .............. G06F 16/128; G06F 11/3409; G06F 16/1727; G06F 16/1748; G06F 3/061
USPC ....................................................... 707/649
See application file for complete search history.

(56) References Cited

U.S. PATENT DOCUMENTS

| | | | | |
|---|---|---|---|---|
| 6,434,681 B1 * | 8/2002 | Armangau | .......... | G06F 11/1466 711/202 |
| 6,549,992 B1 * | 4/2003 | Armangau | .......... | G06F 11/1456 714/E11.12 |
| 10,176,183 B1 * | 1/2019 | Shim | ...................... | G06F 3/0617 |
| 10,235,060 B1 * | 3/2019 | Baruch | .................. | G06F 3/0619 |
| 10,824,513 B1 * | 11/2020 | Chandrashekhara | | ........................ G06F 3/0688 |
| 11,474,731 B1 * | 10/2022 | Bharadwaj | .............. | G06F 3/065 |
| 11,593,267 B1 * | 2/2023 | Doddaiah | ............... | G06F 3/061 |
| 11,797,208 B2 * | 10/2023 | Mulholland | .......... | G06F 3/0608 |
| 2012/0054152 A1 * | 3/2012 | Adkins | ................ | G06F 16/2365 707/623 |
| 2018/0113632 A1 * | 4/2018 | Sancheti | ............. | G06F 11/2048 |
| 2018/0260281 A1 * | 9/2018 | Monk | ...................... | G06F 3/065 |
| 2020/0326871 A1 * | 10/2020 | Wu | ........................ | G06F 3/0647 |
| 2021/0034303 A1 * | 2/2021 | Alexeev | .............. | G06F 11/3409 |
| 2021/0064272 A1 * | 3/2021 | Patel | ................... | G06F 12/0811 |

(Continued)

FOREIGN PATENT DOCUMENTS

WO    WO-2018153251 A1 *  8/2018  ........... G06F 16/128

*Primary Examiner* — Phuong Thao Cao
(74) *Attorney, Agent, or Firm* — Anderson Gorecki LLP

(57) ABSTRACT

For a source device with an activated snapshot, time series-based prediction of source device write IO operations is implemented, on a per-extent basis, to predict a subset of the source device extents that are likely to be hot (receive write IO operations) during an upcoming time window. Snapshot tracks corresponding to tracks of the predicted hot extents are pre-deduplicated, to accelerate write IO operations on the source device. In instances where the time series-based prediction correctly predicts write IO operations on tracks of an extent, and the tracks of the extent of the source device are pre-deduplicated on the snapshot, it is possible to implement the write IO operations as a redirect on write operation, without first replicating the original track of source data for use by the snapshot. Write IO operations on tracks that are not pre-deduplicated are implemented as copy on write operations.

18 Claims, 6 Drawing Sheets

(56) References Cited

U.S. PATENT DOCUMENTS

| 2021/0117390 | A1* | 4/2021 | Chamarthy | G06F 11/1451 |
| 2021/0303177 | A1* | 9/2021 | Kanjirathinkal | G06F 3/0604 |
| 2022/0067549 | A1* | 3/2022 | Vokaliga | G06N 5/04 |
| 2023/0418505 | A1* | 12/2023 | Dar | G06F 3/0679 |

* cited by examiner

TIME SERIES FORECASTING FOR PRE-DEDUPLICATION OF SNAPSHOTS

FIELD

This disclosure relates to computing systems and related devices and methods, and, more particularly, to a method and apparatus for using time series-based prediction of source device extent write IO operations to pre-deduplicate snapshot tracks to reference source backend disk allocations in advance of the source device write IO operations.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

For a source device with an activated snapshot, time series-based prediction of source device write IO operations is implemented, on a per-extent basis, to predict a subset of the source device extents that are likely to be hot (receive write IO operations) during an upcoming time window. Snapshot tracks that correspond to the predicted hot extents are pre-deduplicated to accelerate write IO processing of the write IO operations on tracks of the source device. In instances where the time series-based prediction correctly predicts write IO operations on tracks of an extent, and the tracks of the extent of the source device are pre-deduplicated on the snapshot, it is possible to implement the write IO operations as a redirect on write operation without first replicating the original track of source data for use by the snapshot. In instances where the time series-based prediction does not correctly predict a write IO operation on a track of an extent of the source device, the write IO operation is implemented using a copy on write operation to read the original track of source data and write that original track of source data to a snapshot replication area, before accepting the host data to the original backend disk allocation.

In some embodiments, a method of time series-based pre-deduplication of a snapshot of a source device, includes providing a source device, the source device being divided into a plurality of extents, each extent having a plurality of tracks, each track having a corresponding backend disk allocation of storage on storage resources, and activating a snapshot on the source device, the snapshot having a plurality of extents corresponding to the plurality of extents of the source device, and each extent of the snapshot having a plurality of tracks corresponding to respective tracks of the corresponding extent of the source device. The method also includes predicting write IO operations on tracks of the source device on a per-extent basis for an upcoming time window, selecting a percentage of the extents of the source device with a largest number of predicted write IO operations for the upcoming time window, the selected percentage being less than 100% of the extents of the source device, and creating a deduplication relationship between tracks of the selected extents of the source device and corresponding tracks of corresponding snapshot extents, to cause the tracks of the corresponding snapshot extents to reference backend disk allocations of storage on storage resources allocated to the corresponding tracks of the selected extents of the source device.

In some embodiments, predicting write IO operations includes monitoring write IO operations on extents of the source device over time, using the monitored write IO operations to create and update an Auto-Regressive Integrated Moving Average (ARIMA) time-series model, and using the ARIMA time-series model to predict which extents of the source device will have the largest number of predicted write IO operations for the upcoming time window from a time-series set of lagged previous values. In some embodiments, the monitored write IO operations include write IO count and write IO size parameters, the write IO count and write IO size parameters being monitored on a per-extent basis over a preceding set of time windows to form the time-series set of lagged previous values. In some embodiments, the extents of the source device with the largest number of predicted write IO operations for the upcoming time window includes extents of the source device with the largest number of predicted write IO operations to unique tracks during the upcoming time window.

In some embodiments, creating the deduplication relationship between tracks of the selected extents of the source device and corresponding tracks of corresponding snapshot extents causes corresponding tracks of the source device and snapshot device to both have metadata that point to the same back-end allocation.

In some embodiments, the method further includes receiving a write IO operation on a first track of the source device, and determining whether a first backend allocation of the first track of the source device is in a first deduplication relationship with a corresponding track of the snapshot device. In response to a determination that the first backend allocation of the first track of the source device is in a first deduplication relationship with a corresponding track of the snapshot device, implementing the write IO operation as a redirect on write IO operation. In response to a determination that the first backend allocation of the first track of the source device is not in a first deduplication relationship with a corresponding track of the snapshot device, implementing the write IO operation as a copy on write IO operation.

In some embodiments, implementing the write IO operation as the redirect on write IO operation includes allocating a new backend disk allocation for the write IO operation, storing data associated with the write IO operation to the new backend disk allocation, and maintaining original track data in the first backend allocation for use by the snapshot device. In some embodiments, implementing the write IO operation as the copy on write IO operation includes copying original track data from the first backend allocation to a second backend allocation for use by the snapshot device and, after copying the original track data to the second backend allocation, storing data associated with the write IO operation to the first backend disk allocation.

In some embodiments, the percentage of the extents of the source device with the largest number of predicted write IO operations for the upcoming time window is a user-settable hyperparameter.

In some embodiments, the percentage of the extents of the source device with the largest number of predicted write IO operations for the upcoming time window is a learned value based on measured performance increases associated with reduction in storage system response time to write operations on the source device with the activated snapshot caused by creating the deduplication relationships between tracks of the selected extents of the source device and corresponding tracks of corresponding snapshot extents.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable storage medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable storage medium and implemented by multi-purpose tangible processors, and any combinations thereof.

Figure 1:
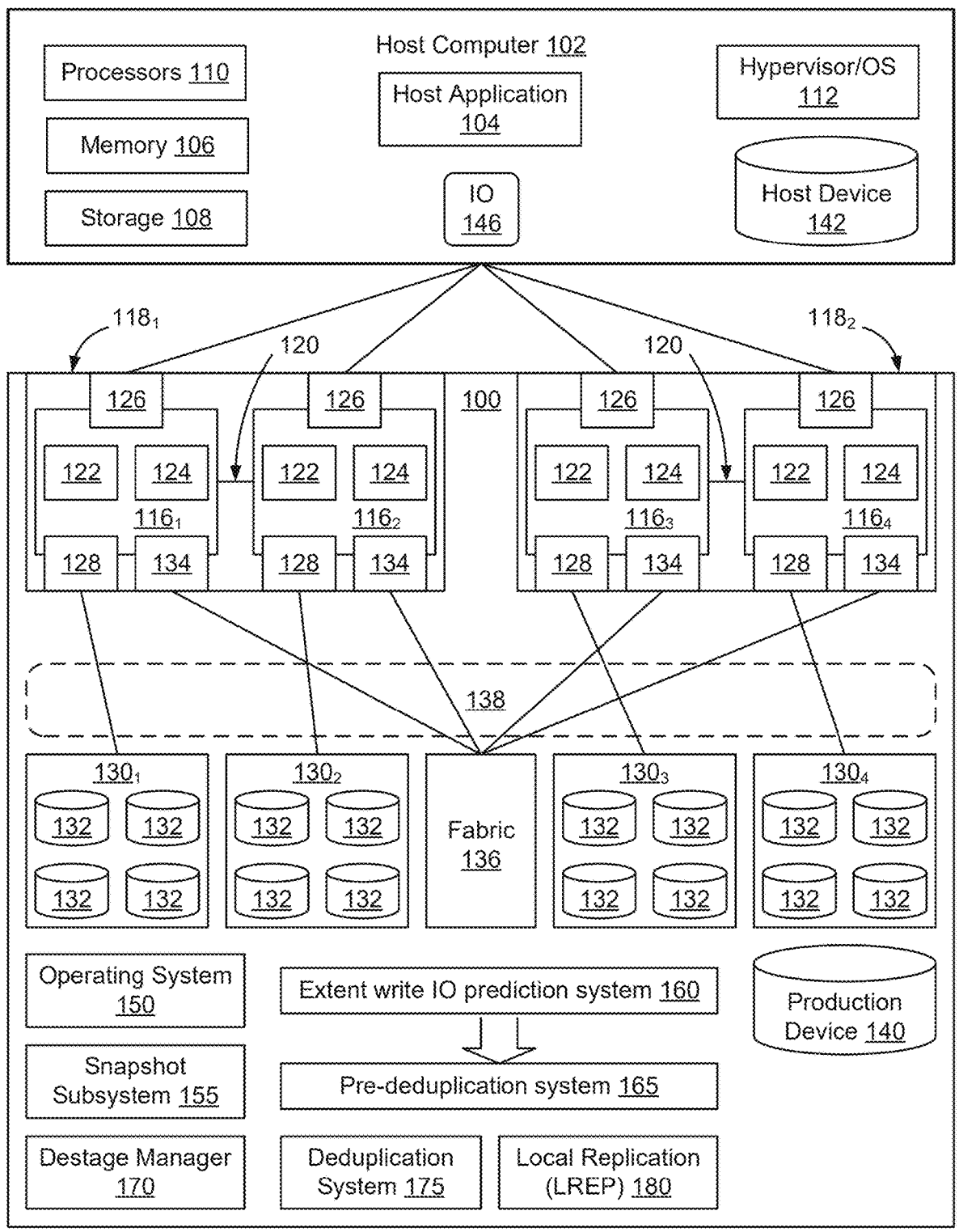
FIG. 1 is a functional block diagram of a host computer connected to an example storage system, the storage system including an extent write IO prediction system and a snapshot pre-deduplication system to accelerate host write IOs on source devices with an activated snapshot, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCLe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or over an interconnecting fabric 136. An example interconnecting fabric 136 may be implemented using PCLe or IB. Each compute node 116 may allocate a portion or partition of its respective local volatile memory 124 to a virtual shared memory 138 that can be accessed by any compute node 116 of storage system 100.

The storage system 100 maintains data for host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106 or storage 108. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$.

In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, in some embodiments the storage system includes a snapshot subsystem 155 configured to create point-in-time copies of storage volumes. As used herein, the term "snapshot" is used to refer to a point-in-time copy of data of a storage volume. In some embodiments, snapshots have references to all tracks of the storage volume. Accordingly, in instances where there are changes to a storage volume between creation of successive snapshots, the later created snapshot will capture the differential changes to the storage volume that have occurred since creation of the previous snapshot, while continuing to include references to all tracks of the storage volume.

In some embodiments, when a snapshot is created, activation of the snapshot does not result in generation of a copy of the data of the source device. Copying the actual data of the source device to create the snapshot would result in consumption of significant storage resources and require use of significant processor resources. Accordingly, in instances where the snapshot does not contain a copy of the data of the source device, when a write IO occurs on a track of the source device, the write IO must be implemented in such a way so as to preserve the previous version of the data of the track of the source device that was originally stored in the back-end allocation of storage resources. There are two basic ways to maintain the data of the track that was originally stored in an allocation of back-end storage resources, which are referred to herein as "copy on write" and "redirect on write".

When "copy on write" is being used to maintain the data of the source device to ensure that the data is available for the activated snapshot, when a write IO operation occurs on a track of the source device, the original data that is contained in the backend disk allocation for the track is first copied to a snapshot replication area. After the source data has been copied from the original backend disk allocation to the snapshot replication area, the new write IO data is written to the original backend disk allocation for the source device track. Copy on write thus enables activation of a snapshot and preserves the original data of the source device as write IOs occur, without requiring creation of metadata in advance of the write for the snapshot copy. However, when copy on write is being used to maintain the original source data, activation of a snapshot can negatively affect the response time of the storage system to write IO operations on the source device with the activated snapshot. Specifically, using local replication LREP to read the original data from the original back-end allocation for the track, write the original data to the snapshot replication area, and generate IO versioning metadata to correlate the different versions of data with the source device and with the snapshot copy takes a finite amount of time. This finite additional time increases the storage system response time to the host, which negatively impacts the host.

When "redirect on write" is used to maintain the data of the source device to ensure that data is available for the snapshot copy, when a snapshot of the source device is activated, the tracks of the snapshot are processed to generate metadata that causes the tracks of the snapshot to reference the backend disk allocations containing the data of the tracks of the source device. Then, when a write IO operation occurs on a track of the source device, a new back-end allocation can be provided to implement the write IO operation while allowing the snapshot to continue referencing the original back-end allocation. This has the advantage of enabling the storage system to quickly implement the write IO operation, thus providing a faster response time to the host when the host issues write IO operations to a source device with an activated snapshot. However, generating the metadata for all the tracks of the snapshot is CPU intensive process, which itself can negatively impact the performance of the storage system. In an environment where the storage system is providing access to thousands of source devices, and frequently activated snapshots, the amount of CPU resources required to generate metadata to enable write operations to be implemented using redirect on write processes can be prohibitive.

As shown in FIG. 1, in some embodiments the storage system includes an extent write IO prediction system 160 and a snapshot pre-deduplication system 165 to accelerate host write IOs on source devices with an activated snapshot. As described in greater detail herein, in some embodiments the extent write IO prediction system 160 analyzes historical write IO operations on the source device and predicts, on a per-extent basis, which extents of the source device are likely to be hot during an upcoming time window. The term "hot" in this context, is used to refer to the likelihood that write IOs will occur on one or more tracks of the extent during the upcoming time window. In some embodiments, the extents of the source device are ranked relative to each other, and portion (fewer than all) of the extents of the source device that are determined to be the hottest (most likely to receive write IOs during the upcoming time window) are selected for pre-deduplication.

The pre-deduplication system 165, in some embodiments, is used to cause tracks of the selected hottest extents of the snapshot to point to the same back-end allocation as the source tracks of the corresponding extents of the source device. As shown in FIG. 1, in some embodiments the storage system 100 includes a deduplication system 175 that is used to implement deduplication relationships between tracks of data. A deduplication relationship, as that term is used herein, refers to a relationship where two tracks, of a device or of two or more separate devices, both have metadata that point to the same back-end allocation. When two tracks are in a deduplication relationship, such that both tracks are owed data from the same back-end allocation, when a write IO occurs on one of the tracks the deduplication system will cause a new back-end allocation to be provided to accommodate the new write IO while maintaining the original back-end allocation for the other track.

Deduplication is often used in connection with data reduction. For example, if 100 users of an email system store the same copy of an email, deduplication can be used to cause the storage system to save one copy of the data representing the email, and then use metadata to reference that copy of the data for each of the other 99 users. By using deduplication, it is thus possible to reduce the amount of back-end storage resources that are required to implement a set of devices.

According to some embodiments, this deduplication system 175 is used to pre-deduplicate a portion of the tracks of the snapshot device to cause those tracks to point to the back-end allocations of the source device. When a write occurs on a track of the source device that is pre-deduplicated, a destage manager 170, that is responsible for writing the data of the write operation to backend storage resources 132 will determine that the current back-end allocation is in a deduplication relationship with another track (of the activated snapshot) and automatically allocate a new backend disk allocation to the write IO operation on the source device. This enables the existing deduplication process 175 and destage manager process 170 of the storage system to be optimized to handle writes to a source device with an activated snapshot, to enable a portion of the write IO operations to be implemented as redirect on write IO operations rather than requiring the local replication system 180 to implement all write IO operations to a source device with an activated snapshot as copy on write IO operations. By implementing a portion of the write IO operations on the source device as redirect on write IO operations, it is possible to greatly reduce the response time of the storage system to host 10 operations on the source device with an activated snapshot.

Figure 2:
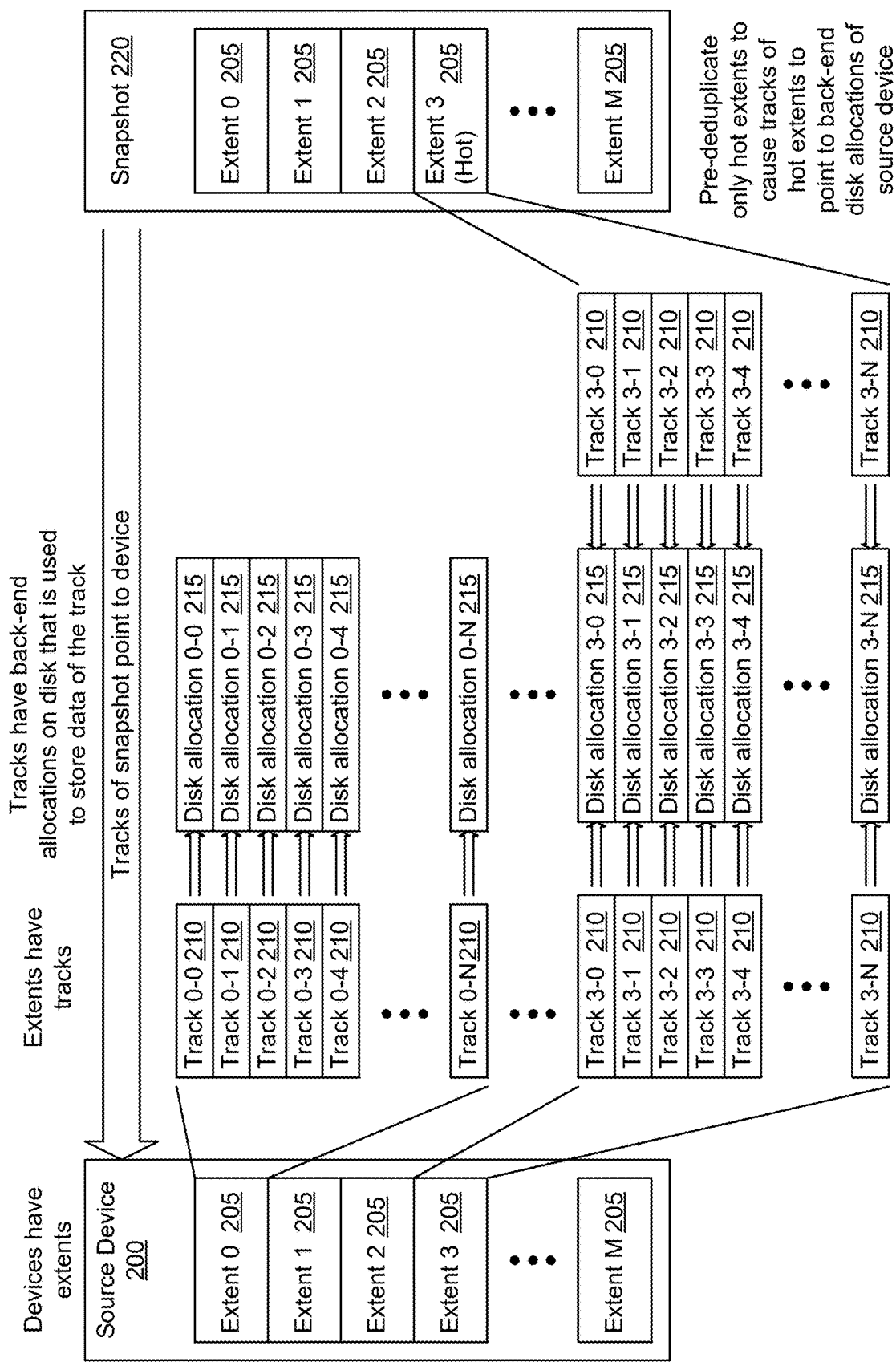
FIG. 2 is a block diagram showing an example source device with an activated snapshot, according to some embodiments.

FIG. 2 is a block diagram showing an example source device with an activated snapshot, according to some embodiments. As shown in FIG. 2, in some embodiments the source device is broken into blocks referred to herein as "extents" 205. An extent 205, for example, might be a storage area of fixed size, for example 1 M of data although the particular size of the extent will depend on the particular implementation. Each extent is broken into a large number of tracks 210. As shown in FIG. 2, tracks 210 are much smaller than extents 205, such that each extent 205 contains a large number of tracks 210. For example, if each track is 16 kb, an extent with a size of 1 Mb would have on the order of about 250 tracks. The particular track size and extent size will depend on the particular implementation.

Tracks 210 are assigned allocations 215 of back-end storage 132 that are used to hold the host data. The tracks 210 appear as contiguous areas of storage, but the back-end allocations 215 can be provided at discontinuous regions of managed drives 132. When a snapshot device 220 is activated on a source device 200, the data of the source device 200 at the point in time where the snapshot is activated will be preserved, such that the snapshot device 220 is able to be used to access the data stored in the backend disk allocations 215 at the point in time when the snapshot was activated.

As shown in FIG. 2, in some embodiments a determination is made as to which extents of the source device are predicted to receive the largest number of host write IO operations during an upcoming time interval. An extent 205 of a source device 200 that is predicted to receive a large number of host write IO operations during an upcoming time interval will be referred to herein as a "hot" extent. A portion of the source device hot extents are pre-deduplicated on the snapshot device 220 to cause the tracks 210 of the corresponding snapshot extent 205 to point to the back-end disk allocations 215 of the source device 200. For example, in FIG. 2 extent 3 has been predicted to be "hot" during an upcoming time interval. Accordingly, the corresponding tracks 210 of the snapshot device 220 of extent 3 have been pre-deduplicated to point to the backend disk allocations of the corresponding tracks of extent 3 of the source device. By pre-deduplicating the tracks of the hot extent in the snapshot, it is possible to implement any write IO on the source device to the corresponding extent as a redirect on write operation rather than a copy on write operation, thus accelerating processing of host write IO operations on tracks of the pre-deduplicated extent. By pre-deduplicating only the extents that are predicted to be hot, it is possible to minimize the amount of compute resources required to implement pre-deduplication of the snapshot tracks.

Figure 3:
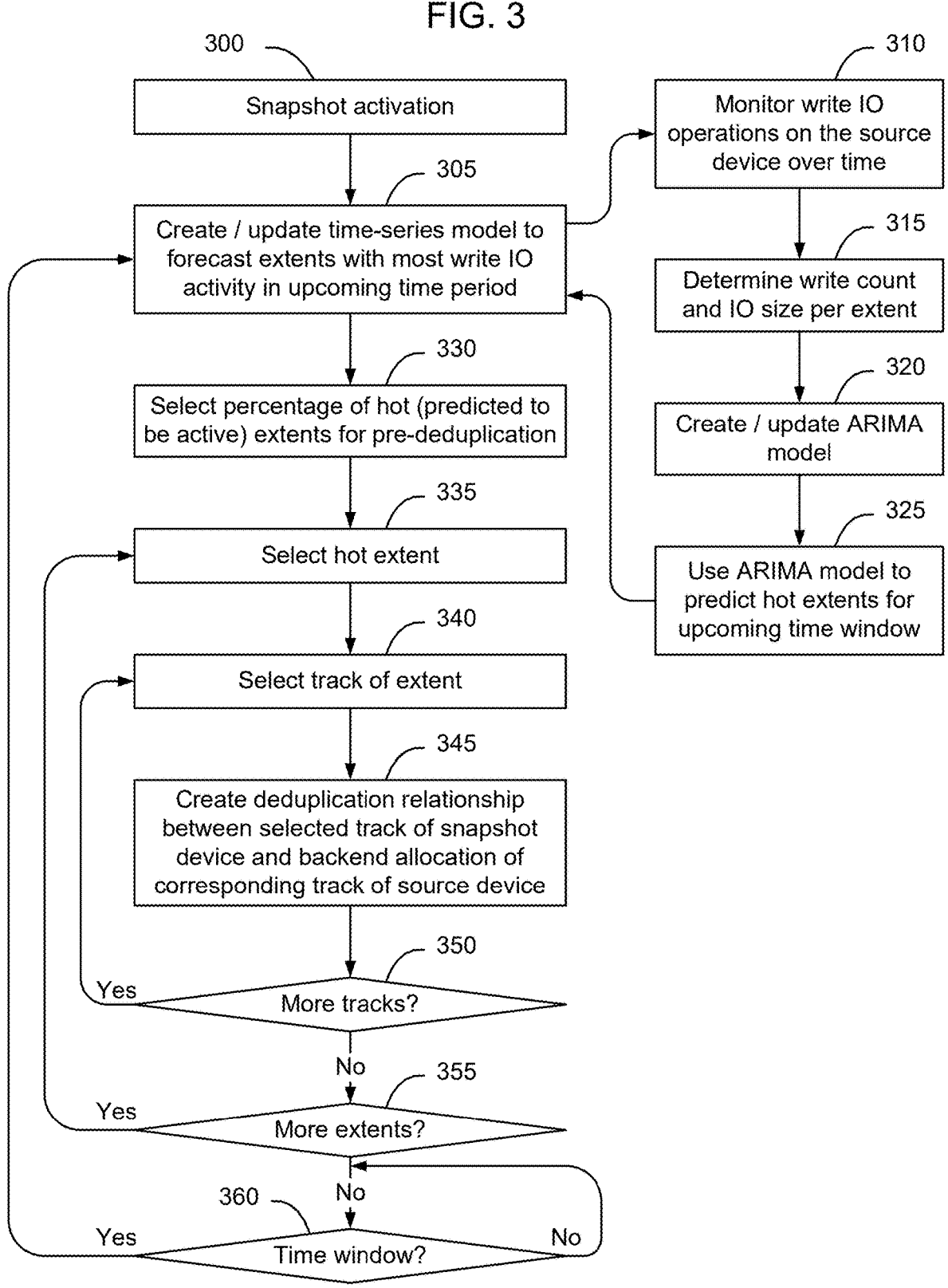
FIG. 3 is a flow chart of an example process of predicting source device write IO operations on a per-extent basis for an upcoming time window, and using the time series-based prediction of source device extent write IO operations to pre-deduplicate snapshot tracks to reference source backend disk allocations in advance of source device write IO operations, according to some embodiments.

FIG. 3 is a flow chart of an example process of predicting source device write IO operations on a per-extent basis for an upcoming time window, and using the time series-based prediction of source device extent write IO operations to pre-deduplicate snapshot tracks to reference source backend disk allocations in advance of source device write IO operations, according to some embodiments. As shown in FIG. 3, in some embodiments when a snapshot is activated on a device (block 300), a time-series model is used to forecast host write IO operations on the source device over an upcoming time window on a per-extent basis (block 305). In some embodiments, creating the time-series model includes monitoring write IO operations on the source device over time (block 310). The time-series model may be created before activation of the snapshot or after activation of the snapshot, depending on the implementation. For example, in some embodiments write IO operations on the source device are monitored over a period of time regardless of whether a snapshot is activated on the source device. Example write IO parameters that may be monitored on a per-extent basis over time include write IO count and write IO size per extent over a preceding set of time windows (block 315).

A time-series model is created from the previously observed time series write IO operations on the source device. For example, an Auto-Regressive Integrated Moving Average (ARIMA) time-series model may be created for the source device. Although some embodiments are described in which the time-series model is implemented using an ARIMA model, it should be understood that other time-series models may be used as well, such as Seasonal ARIMA—which may provide more accurate predictions if the write IO operations exhibit strong seasonality, a deep learning neural network, and other models designed to predict future values from a time-series set of lagged previous values.

As shown in FIG. 3, from the measured time-series write IO operations on the source device, a time series model such as an ARIMA model is created/updated (block 320). The ARIMA model is then used to predict hot extents for an upcoming time window (block 325). An example time window may be 5 minutes of time, or some other period of time depending on the implementation. In some embodiments, "hot extents" are the extents that are predicted by the ARIMA model to receive the largest number of write IO operations to unique tracks during the upcoming time window. For example, in some embodiments an extent that is predicted to receive 20 write IO operations on 20 unique tracks over the time window would be considered to be more hot than an extent that is predicted to receive 30 write IO operations on IO unique tracks during the time window.

A portion of the hottest extents of the source device are then selected (block 330). In some embodiments, the percentage of the hottest extents that are selected in block 330 is a user-settable hyperparameter. For example, a value of 5% could be selected in block 330, such that 5% of the extents of the source device, that are predicted to receive the most write IO operations during the upcoming time window, are selected for pre-deduplication. In some embodiments, the selected portion of hot extents is less than 100% of the extents of the source device. In some embodiments, the selected portion of hot extents is less than 20% of the extents of the source device. In some embodiments, the selected portion of hot extents is in a range of between 1% and 10% of the extents of the source device.

In some embodiments the percentage value of block 330 may be a learned value, based on measured or detected performance increases associated with pre-deduplication. For example, as described in greater detail in connection with FIG. 6, in some embodiments implementing pre-deduplication on a portion of the extents of the source device that are predicted to be hot during the upcoming time window has a noticeable effect on reducing the storage system response time when a snapshot is activated on the source volume. However, pre-deduplication consumes CPU resources of the storage system, which are required for other processes such as destaging data from global memory to back-end storage resources. In some embodiments, the reduction in storage system response time is measured and the pre-deduplication percentage of block 330 is varied to balance the consumption of processing resources with response time benefits. Since each extent of the snapshot generally has the same number of tracks, pre-deduplicating a given extent on average will consume a relatively consistent amount of CPU resources. By increasing the pre-deduplication percentage over time and measuring the reduction in storage system response time, it would be expected that there is a percentage threshold after which additional pre-deduplication has little impact on storage system response time. In some embodiments, the pre-deduplication percentage is hence implemented as a learned value.

Once the percentage of extents has been determined, the pre-deduplication system 165 selects a hot extent (block 335), selects a track of the snapshot extent (block 340) and creates a deduplication relationship between the track of the snapshot and the allocation of back-end storage resources for the corresponding track of the source device (block 345). The pre-deduplication system 165 then determines if there are more tracks of the selected snapshot extent (block 350). In response to a determination that there are more tracks of the selected extent (a determination of YES at block 350), the next track of the extent is selected (block 340) and a deduplication relationship is created to cause the track of the snapshot to reference the allocation of back-end storage resources for the corresponding track of the source device (block 345). This process (blocks 340, 345, 350) iterates until all tracks of the selected snapshot extent are pre-deduplicated (a determination of NO at block 350).

The pre-deduplication system 165 then determines if there are more hot snapshot extents that need to be processed (block 355). If there are additional snapshot extents that need to be processed (a determination of YES at block 355), the process returns to block 335 to select a subsequent snapshot extent. Once all hot snapshot extents (up to the pre-deduplication threshold percentage set in block 330) have been processed (a determination of NO at block 355), the deduplication process stops for the remainder of the time window (block 360). At the end of the time window (a determination of YES at block 360), the process iterates for a subsequent time window.

Although FIG. 3 has been shown and described as having the pre-deduplication system 165 serially operate on extents and serially operate on tracks of the extents, it should be understood that the operations may be implemented in parallel. Specifically, since pre-deduplication of any given track of a snapshot extent is independent of pre-deduplication of any other track, it is possible to allocate the pre-deduplication process into parallel processes to be implemented simultaneously on multiple processing nodes if desired, depending on the implementation. In some embodiments, pre-deduplication is implemented as a background process on the storage system.

Figure 4:
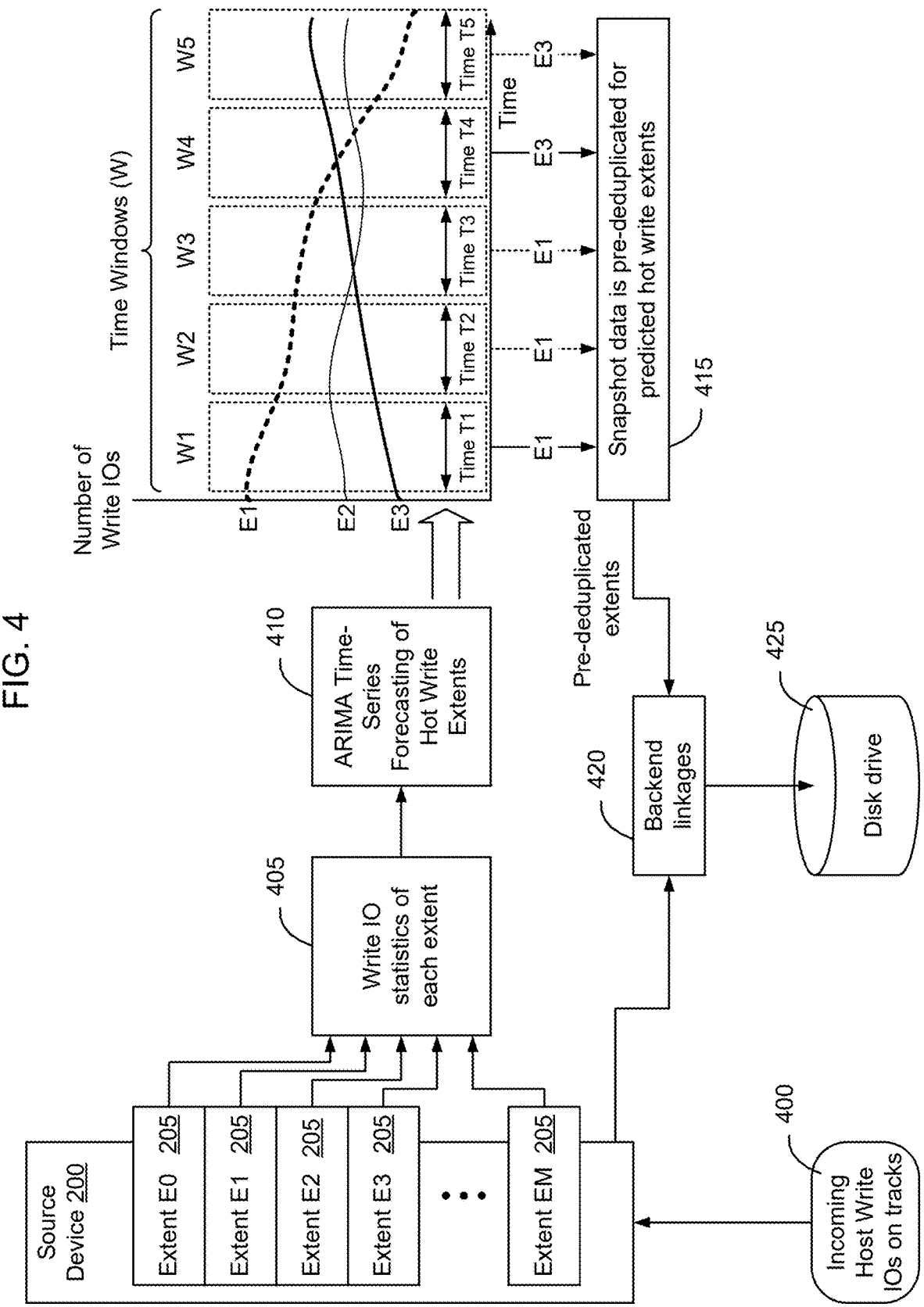
FIG. 4 is a block diagram showing the flow of information between a set of components configured to implement an example process of predicting source device write IO operations on a per-extent basis for an upcoming time window, and using the time series-based prediction of source device extent write IO operations to pre-deduplicate snapshot tracks to reference source backend disk allocations in advance of source device write IO operations, according to some embodiments.

FIG. 4 is a block diagram showing the flow of information between a set of components configured to implement an example process of predicting source device write IO operations on a per-extent basis for an upcoming time window, and using the time series-based prediction of source device extent write IO operations to pre-deduplicate snapshot tracks to reference source backend disk allocations in advance of source device write IO operations, according to some embodiments.

As shown in FIG. 4, in some embodiments source device 200 has extents 205, each of which has multiple tracks. Write IO statics on the tracks of the extents are collected on a per-extent basis over time (block 405) and used to create a time series model, such as an ARIMA model, that is used to forecast which extents of the source device will be hot over an upcoming time window (block 410). FIG. 4 shows an example graph with hypothetical time-series predictions for three extents E1, E2, and E3 over five time windows W1, W2, W3, W4, and W5. As shown in FIG. 4, for time window W1, the time series model predicted that extent E1 would have the most write IO operations, and hence be the hottest extent. Accordingly, the identity of extent E1 was provided to the pre-deduplication system 165 to cause the pre-deduplication system 165 to deduplicate the tracks of extent E1. Likewise, extent E1 was predicted by the time series model to be the hottest extent for time windows W2 and W3. Since extent E1 had already had its tracks pre-deduplicated in connection with time window W1, the pre-deduplication system 165 may not need to spend significant CPU resources to implement pre-deduplication of the selected hot extent E1 during windows W2 and W3. For time window W4, the time series model predicts that extent E3 will be the hottest extent. Accordingly, at the start of the time window W4, the identity of extent E3 is provided to the pre-deduplication system 165 to cause the pre-deduplication system 165 to deduplicate the tracks of extent E3. During time window W5, the time series model predicts that extent E3 will be the hottest of the three illustrated extents.

As shown in FIG. 4, in some embodiments the tracks of the source device are provided with backend disk allocations of storage on disk drive 425. Backend linkages 420 such as metadata pages maintain the correlation between source device tracks and the backend disk allocations. The pre-deduplication system 165, in some embodiments, creates similar backend linkages 420 for the tracks of the selected hot extent to cause the tracks of the snapshot to be linked to corresponding back-end allocations. The fact that two devices (the source device and the snapshot) now reference the same backend disk allocation is provided to the deduplication system 175. Accordingly, when a host write is received on a track of the source device, the deduplication system 175 will determine that the backend disk allocation associated with the write to the source device track is shared by another device. In response to this determination, the destage manager will automatically generate a new backend disk allocation for the write on the source device track, to enable the host write 400 to be implemented on the pre-deduplicated track as a redirect on write operation rather than a copy on write operation. This accelerates processing of host write IO operations in instances where the time-series model accurately forecasts that host write IO operations will occur on particular extents, thus causing those particular extents to be pre-deduplicated at the snapshot device.

Figure 5:
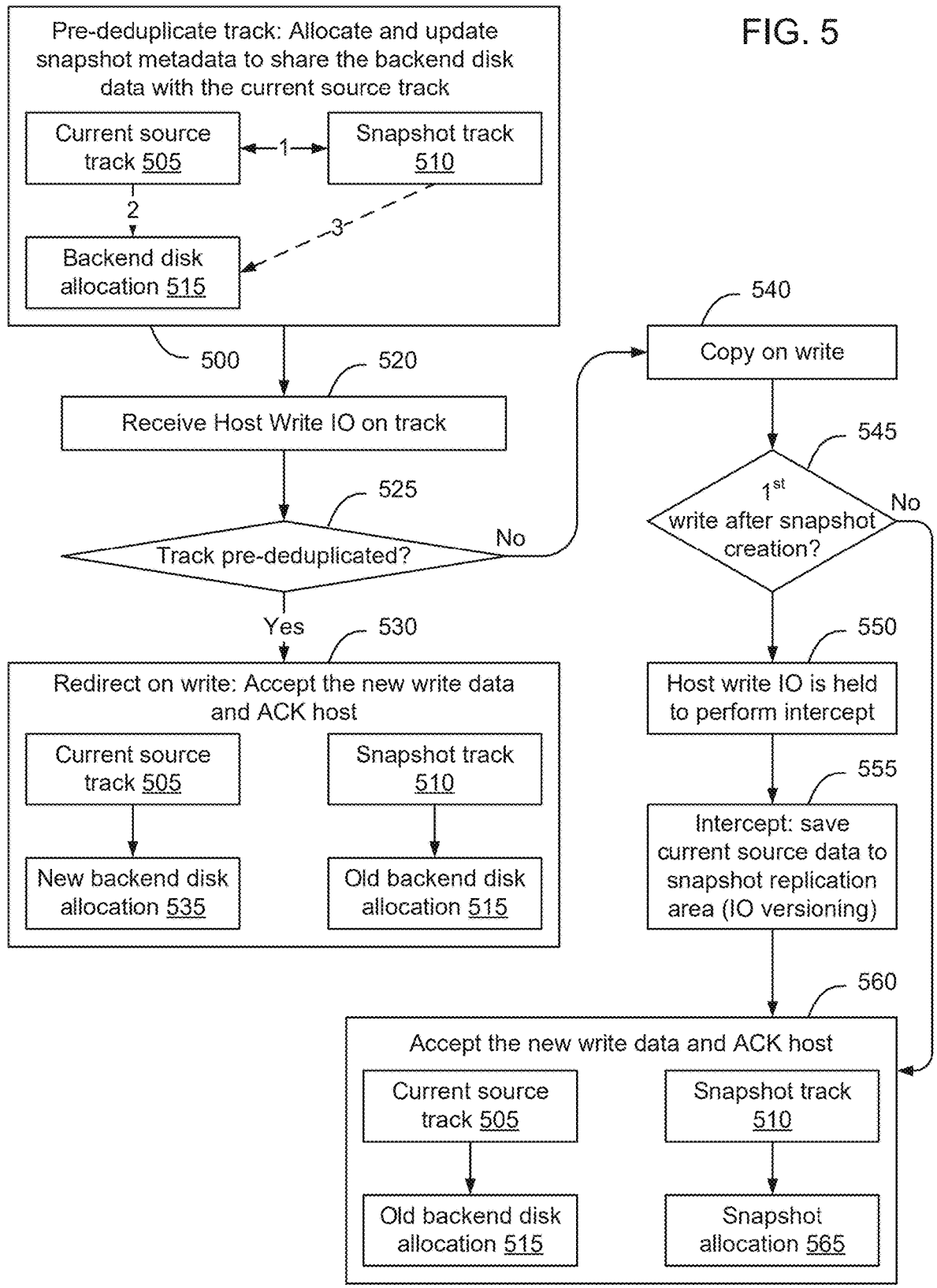
FIG. 5 is a flow chart of an example process of implementing write IO operations on a source device with an activated snapshot, in which a portion but not all of the tracks of the snapshot have been pre-deduplicated to reference source backend disk allocations in advance of source device write IO operations, according to some embodiments.

FIG. 5 is a flow chart of an example process of implementing write IO operations on a source device with an activated snapshot, in which a portion but not all of the tracks of the snapshot have been pre-deduplicated to reference source backend disk allocations in advance of source device write IO operations, according to some embodiments. As shown in FIG. 5, in some embodiments the extent write IO prediction system 160 and pre-deduplication system 165 implement the process described in connection with FIGS. 3-4 to allocate and update snapshot metadata (block 500), to cause the tracks of selected extents of the snapshot to share backend disk allocations of disk data (arrow 3) with the current source track (arrow 2) (blocks 505, 510, 515). This causes a deduplication link (arrow 1) to be created between the source track and the corresponding snapshot track.

As shown in FIG. 5, when a host write IO is received on a track of the source device (block 520), a determination is made as to whether the corresponding track of the snapshot has been pre-deduplicated (block 525). In some embodiments, block 525 is implemented by the deduplication system 175 by determining whether two tracks (source device track 505 and snapshot track 510) both reference the same backend disk allocation 515 in a deduplication relationship. If the track is pre-deduplicated (a determination of YES at block 525), the write IO is able to be processed as a redirect on write IO (block 530) by accepting the new write data to a slot of shared global memory, acknowledging the write IO to the host, and destaging the write IO to a new backend disk allocation (block 535).

In response to a determination that the corresponding track of the snapshot has not been pre-deduplicated with the corresponding track of the source device (a determination of NO at block 525), the write IO is implemented as a copy on write IO operation (block 540). Specifically, as shown in FIG. 5, in some embodiments a determination is made as to whether this host write IO operation is the first write IO operation to the track of the source device (block 545). If the write is the first write to the track of the source device (a determination of YES at block 545) the data that is currently stored at the backend disk allocation for the track will need to be saved for the snapshot. Accordingly, the host write IO is held to perform an intercept (block 550). The intercept, as that term is used herein, causes the data that is currently stored in the back-end allocation for the track to be copied to the snapshot replication area (block 555). Copying data requires the original data to be read from the backend disk allocation and then subsequently written to the snapshot replication area. Metadata is also generated to manage the versions of the IO data within the storage system. Once the intercept is complete, the write IO is accepted and the write IO is acknowledged to the host (block 560). As shown in FIG. 5, after the intercept the current source track (block 505) points to the old back-end disk allocation (block 515). The snapshot track (block 510) points to the allocation of the snapshot replication area (block 565) where the original data of the source device was copied using the copy on write IO processing.

It is possible for multiple host write IO operations to occur on the same track of the source device. However, once the initial intercept has taken place in connection with the first host write IO to a given track, the original data of the track of the source device that is owed to the snapshot will already have been moved to the snapshot replication area. Accordingly, for the second and subsequent writes to the same track of the source device after activation of the snapshot, it is not necessary to perform the intercept process in connection with the second or subsequent host write to the source track. Accordingly, in response to a determination that the corresponding track of the snapshot has previously received a write IO after activation of the snapshot (a determination of YES at block 545), the host write IO is simply written to the old backend disk allocation (block 515). As noted above, in some embodiments the prediction as to whether an extent of the source device is "hot" looks at predicted writes to unique tracks of the extent. The reason for this is that second and subsequent writes to the same track of the source device do not require an intercept, which is only required for the first write to a given track of the source device. By ranking the extents of the source device by looking at writes to unique tracks, it is thus possible to rank extents to maximize the number of unique tracks that are pre-deduplicated in the snapshot.

Figure 6:
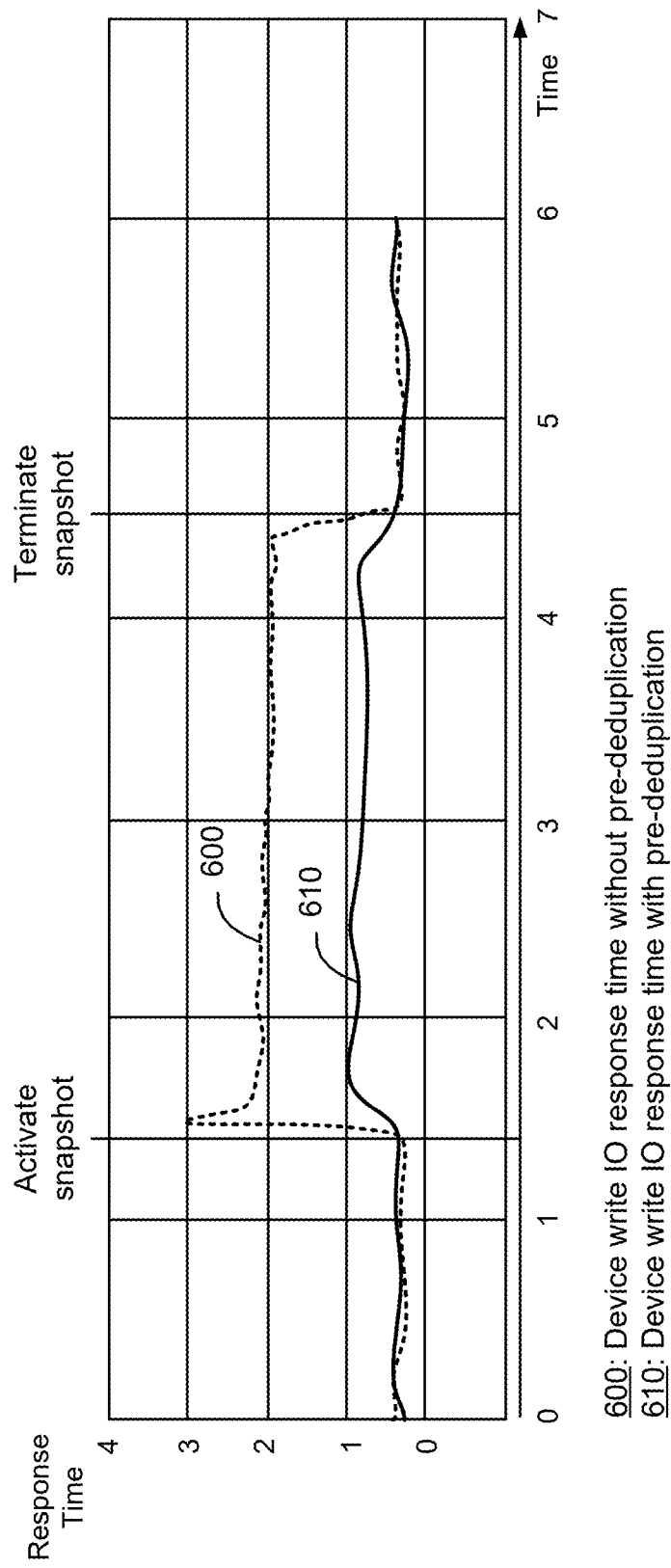
FIG. 6 is a graph showing storage system response time to host write IO operations on a source device over time, and showing the storage system response time increase associated with activation of a snapshot on the source device without pre-deduplication, and with time series-based prediction of source device write IO operations to selectively implement snapshot track pre-deduplication, according to some embodiments.

FIG. 6 is a graph showing storage system response time to host write IO operations on a source device over time, and showing the storage system response time increase associated with activation of a snapshot on the source device without pre-deduplication, and with time series-based prediction of source device write IO operations to selectively implement snapshot track pre-deduplication, according to some embodiments. In FIG. 6, the units on the x and y axes are arbitrary units of time. The response time on the y axis, for example, might be in units of milliseconds, whereas the overall time that measurements are made (along the x axis) might be in the hundreds of seconds, minutes, hours, etc.

As shown in FIG. 6, at time T=0 the storage system response time is approximately 0.4 time units. At time=1.5 a snapshot is activated. Line 600 shows the storage system response time associated with processing write IO operations to a source device without the use of pre-deduplication. As shown in FIG. 6, at initial activation of the snapshot the storage system response time jumped from approximately 0.4 time units to approximately 3 time units, and then leveled out at approximately 2 time units. When the snapshot was terminated at time=4, the storage system response time returned to approximately 0.4 time units. Activation of the snapshot, accordingly, caused almost a five-fold increase in storage system response time without the use of pre-deduplication.

Line 610 shows the storage system response time associated with processing write IO operations to the source device with the use of pre-deduplication on a selected predicted percentage of hot snapshot extents. As shown in FIG. 6, at initial activation of the snapshot the storage system response time increased from approximately 0.4 time units to approximately 0.8 time units, and remained relatively constant at that level. When the snapshot was terminated at time=4, the storage system response time returned to approximately 0.4 time units. Activation of the snapshot, accordingly, caused an increase in response time of the storage system, however the response time increase associated with use of pre-deduplication was much less than the response time increase observed without the use of pre-deduplication on a selected predicted percentage of hot snapshot extents.

Pre-deduplication of snapshot extents, in some embodiments, is implemented as a background process. In some embodiments, in instances where the storage system is operating in excess of 50% write IO capacity, implementing pre-deduplication may be observed to impact destage performance. However, in instances where the storage system is operating at around 50% or less write IO capacity, implementing pre-deduplication of predicted hot snapshot extents can greatly reduce the impact of activation of a snapshot on a source device, while still not impacting overall destage performance of the storage system.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of time series-based pre-deduplication of a snapshot of a source device, comprising:
providing a source device, the source device being divided into a plurality of extents, each extent having a plurality of tracks, each track having a corresponding backend disk allocation of storage on storage resources;
activating a snapshot on the source device, the snapshot having a plurality of extents corresponding to the plurality of extents of the source device, and each extent of the snapshot having a plurality of tracks corresponding to respective tracks of the corresponding extent of the source device;
predicting write IO operations on tracks of the source device on a per-extent basis for an upcoming time window;
selecting a percentage of the extents of the source device with a largest number of predicted write IO operations for the upcoming time window, the selected percentage being less than 100% of the extents of the source device; and
creating a deduplication relationship between tracks of the selected extents of the source device and corresponding tracks of corresponding snapshot extents, to cause the tracks of the corresponding snapshot extents to reference backend disk allocations of storage on storage resources allocated to the corresponding tracks of the selected extents of the source device;
receiving a write IO operation on a first track of the source device; and
determining whether a first backend allocation of the first track of the source device is in a first deduplication relationship with a corresponding track of the snapshot;
in response to a determination that the first backend allocation of the first track of the source device is in a first deduplication relationship with a corresponding track of the snapshot, implementing the write IO operation as a redirect on write IO operation; and
in response to a determination that the first backend allocation of the first track of the source device is not in a first deduplication relationship with a corresponding track of the snapshot, implementing the write IO operation as a copy on write IO operation.

2. The method of claim 1, wherein predicting write IO operations comprises monitoring write IO operations on extents of the source device over time, using the monitored write IO operations to create and update an Auto-Regressive Integrated Moving Average (ARIMA) time-series model, and using the ARIMA time-series model to predict which extents of the source device will have the largest number of predicted write IO operations for the upcoming time window from a time-series set of lagged previous values.

3. The method of claim 2, wherein the monitored write IO operations include write IO count and write IO size parameters, the write IO count and write IO size parameters being monitored on a per-extent basis over a preceding set of time windows to form the time-series set of lagged previous values.

4. The method of claim 2, wherein the extents of the source device with the largest number of predicted write IO operations for the upcoming time window comprise extents of the source device with the largest number of predicted write IO operations to unique tracks during the upcoming time window.

5. The method of claim 1, wherein creating the deduplication relationship between tracks of the selected extents of the source device and corresponding tracks of corresponding snapshot extents causes corresponding tracks of the source device and snapshot to both have metadata that point to the same back-end allocation.

6. The method of claim 1, wherein implementing the write IO operation as the redirect on write IO operation comprises allocating a new backend disk allocation for the write IO operation, storing data associated with the write IO operation to the new backend disk allocation, and maintaining original track data in the first backend allocation for use by the snapshot.

7. The method of claim 1, wherein implementing the write IO operation as the copy on write IO operation comprises copying original track data from the first backend allocation to a second backend allocation for use by the snapshot and, after copying the original track data to the second backend allocation, storing data associated with the write IO operation to the first backend disk allocation.

8. The method of claim 1, wherein the percentage of the extents of the source device with the largest number of predicted write IO operations for the upcoming time window is a user-settable hyperparameter.

9. The method of claim 1, wherein the percentage of the extents of the source device with the largest number of predicted write IO operations for the upcoming time window is a learned value based on measured performance increases associated with reduction in storage system response time to write operations on the source device with the activated snapshot caused by creating the deduplication relationships between tracks of the selected extents of the source device and corresponding tracks of corresponding snapshot extents.

10. A system for time series-based pre-deduplication of a snapshot of a source device, comprising:
one or more processors and one or more storage devices storing instructions that are configured, when executed by the one or more processors, to cause the one or more processors to perform operations comprising:
providing a source device, the source device being divided into a plurality of extents, each extent having a plurality of tracks, each track having a corresponding backend disk allocation of storage on storage resources,
activating a snapshot on the source device, the snapshot having a plurality of extents corresponding to the plurality of extents of the source device, and each extent of the snapshot having a plurality of tracks corresponding to respective tracks of the corresponding extent of the source device;
predicting write IO operations on tracks of the source device on a per-extent basis for an upcoming time window;
selecting a percentage of the extents of the source device with a largest number of predicted write IO operations for the upcoming time window, the selected percentage being less than 100% of the extents of the source device;
creating a deduplication relationship between tracks of the selected extents of the source device and corresponding tracks of corresponding snapshot extents, to cause the tracks of the corresponding snapshot extents to reference backend disk allocations of storage on storage resources allocated to the corresponding tracks of the selected extents of the source device;
receiving a write IO operation on a first track of the source device; and
determining whether a first backend allocation of the first track of the source device is in a first deduplication relationship with a corresponding track of the snapshot;

in response to a determination that the first backend allocation of the first track of the source device is in a first deduplication relationship with a corresponding track of the snapshot, implementing the write IO operation as a redirect on write IO operation; and in response to a determination that the first backend allocation of the first track of the source device is not in a first deduplication relationship with a corresponding track of the snapshot, implementing the write IO operation as a copy on write IO operation.

11. The system of claim 10, wherein predicting write IO operations comprises monitoring write IO operations on extents of the source device over time, using the monitored write IO operations to create and update an Auto-Regressive Integrated Moving Average (ARIMA) time-series model, and using the ARIMA time-series model to predict which extents of the source device will have the largest number of predicted write IO operations for the upcoming time window from a time-series set of lagged previous values.

12. The system of claim 11, wherein the monitored write IO operations include write IO count and write IO size parameters, the write IO count and write IO size parameters being monitored on a per-extent basis over a preceding set of time windows to form the time-series set of lagged previous values.

13. The system of claim 11, wherein the extents of the source device with the largest number of predicted write IO operations for the upcoming time window comprise extents of the source device with the largest number of predicted write IO operations to unique tracks during the upcoming time window.

14. The system of claim 10, wherein creating the deduplication relationship between tracks of the selected extents of the source device and corresponding tracks of corresponding snapshot extents causes corresponding tracks of the source device and snapshot to both have metadata that point to the same back-end allocation.

15. The system of claim 10, wherein implementing the write IO operation as the redirect on write IO operation comprises allocating a new backend disk allocation for the write IO operation, storing data associated with the write IO operation to the new backend disk allocation, and maintaining original track data in the first backend allocation for use by the snapshot.

16. The system of claim 10, wherein implementing the write IO operation as the copy on write IO operation comprises copying original track data from the first backend allocation to a second backend allocation for use by the snapshot and, after copying the original track data to the second backend allocation, storing data associated with the write IO operation to the first backend disk allocation.

17. The system of claim 10, wherein the percentage of the extents of the source device with the largest number of predicted write IO operations for the upcoming time window is a user-settable hyperparameter.

18. The system of claim 10, wherein the percentage of the extents of the source device with the largest number of predicted write IO operations for the upcoming time window is a learned value based on measured performance increases associated with reduction in storage system response time to write operations on the source device with the activated snapshot caused by creating the deduplication relationships between tracks of the selected extents of the source device and corresponding tracks of corresponding snapshot extents.

* * * * *